(12) United States Patent
Prasad et al.

(10) Patent No.: US 12,506,432 B2
(45) Date of Patent: Dec. 23, 2025

(54) MIXED CHEMISTRY BATTERY PACK POWER TRANSFER USING A MULTILEVEL FLYING CAPACITOR INVERTER

(71) Applicant: GM Global Technology Operations LLC, Detroit, MI (US)

(72) Inventors: Rashmi Prasad, Troy, MI (US); Chandra S. Namuduri, Troy, MI (US); Junghoon Kim, Ann Arbor, MI (US); Yilun Luo, Ann Arbor, MI (US); Khorshed Mohammed Alam, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 18/506,454

(22) Filed: Nov. 10, 2023

(65) Prior Publication Data

US 2025/0158553 A1  May 15, 2025

(51) Int. Cl.
| | |
|---|---|
| *H02P 27/08* | (2006.01) |
| *B60L 15/00* | (2006.01) |
| *B60L 50/40* | (2019.01) |
| *B60R 16/033* | (2006.01) |

(52) U.S. Cl.
CPC ............ *H02P 27/08* (2013.01); *B60R 16/033* (2013.01); *B60L 15/007* (2013.01); *B60L 50/40* (2019.02); *B60L 2210/10* (2013.01)

(58) Field of Classification Search
CPC .... B60L 15/007; B60L 2210/10; B60L 50/40; B60L 58/22; B60R 16/033; H02P 27/08; H02P 27/14; H02P 27/06; H02P 27/184; H02P 25/092; H02P 23/07; H02P 2101/45; H02P 2201/05; H02P 2201/07; H02P 2201/09; H02P 2207/05; Y02T 10/70

See application file for complete search history.

(56) References Cited

U.S. PATENT DOCUMENTS 11,840,150 B2 * 12/2023 Slepchenkov .......... B60L 58/12

FOREIGN PATENT DOCUMENTS

| | | |
|---|---|---|
| DE | 102022002606 A1 | 1/2024 |
| JP | 2021027698 A | 2/2021 |
| WO | 2022120436 A1 | 6/2022 |
| WO | 2022156171 A1 | 7/2022 |

OTHER PUBLICATIONS

German Application No. 10 2024 100 217.4 filed Jan. 4, 2024; German Office Action dated Feb. 7, 2025; 4 pages.

* cited by examiner

*Primary Examiner* — Antony M Paul
(74) *Attorney, Agent, or Firm* — CANTOR COLBURN LLP

(57) ABSTRACT

A vehicle system includes a first battery pack connected to a second battery pack via a flying capacitor multi-level inverter. The fling capacitor inverter has multiple inverter legs, with each inverter leg being arranged in a flying capacitor topology. A three phase motor is connected to the inverter. A controller connected to the motor and the inverter. The controller includes a memory storing instructions configured to cause the controller to control the inverter as a direct current (DC)-DC converter such that a circulating current passes through the motor, the first battery pack and the second battery pack.

19 Claims, 5 Drawing Sheets

MIXED CHEMISTRY BATTERY PACK POWER TRANSFER USING A MULTILEVEL FLYING CAPACITOR INVERTER

INTRODUCTION

The subject disclosure relates to balancing and transferring power between mixed chemistry battery packs using a multi-level inverter operating as a direct current (DC)-DC converter.

Vehicles, including electric and hybrid electric vehicles, feature a battery storage system for purposes such as powering electric motors, electronics and other vehicle subsystems. Batteries for the battery storage system typically include multiple distinct power cells, each of which stores power for later distribution. The power cells are electrically connected to provide an output power to a power distribution bus on demand. During, or shortly after charging the battery storage system it is desirable to ensure that the power is properly distributed between the battery packs in order to ensure optimal operation thereof. Existing systems utilize identical cell types (referred to as chemistries) within the battery pack. Identical cells can be balanced using passive power balancing techniques.

Different types of battery packs have different properties, such as charge rates and power density. It can be advantageous in some constructions to utilize distinct types of battery packs within a single battery system, thereby allowing different vehicle operational modes to take advantage of the different battery characteristics. Utilizing distinct battery pack types within a single battery, however, renders power transfer between the battery packs, as well as power balancing, difficult and the existing passive balancing systems are unable to effectively transfer power between the battery packs of different chemistries.

Accordingly, it is desirable to provide an active power balancing system for a vehicle battery system including battery packs of multiple distinct types.

SUMMARY

In one exemplary embodiment a vehicle system includes a first battery pack connected to a second battery pack via a flying capacitor multi-level inverter having a plurality of inverter legs, with each inverter leg being arranged in a flying capacitor topology. A motor is connected to the flying capacitor multi-level inverter. A controller is connected to the motor and the flying capacitor multi-level inverter, the controller including a memory storing instructions configured to cause the controller to control the flying capacitor multi-level inverter as a direct current (DC)-DC converter such that a circulating current passes through the motor, the first battery pack and the second battery pack.

In addition to one or more of the features described herein each inverter leg of the flying capacitor multi-level inverter includes a first transistor connecting a positive bus to a high node a second transistor connecting the high node to an alternating (AC) output node, a third transistor connecting the AC output node to a low node, and a fourth transistor connecting the low node to a negative bus, and wherein each phase of the motor is connected to an AC output node of the corresponding leg of the flying capacitor multi-level inverter.

In addition to one or more of the features described herein the motor is a four terminal motor. Controlling the flying capacitor multi-level inverter as a DC-DC converter includes, for each inverter leg: Providing a first control signal to the first transistor and the fourth transistor of each inverter leg, with the first control signal being inverted for the fourth transistor. Providing a second control signal to the second transistor and third transistor of each inverter leg, with the second control signal being inverted for the third transistor. The first control signals and the second control signals control an open/closed state of the first, second, third and fourth transistor of the corresponding inverter leg via pulse width modulation. Each first control signal and the second control signal is phase shifted from each other first control signal and second control signal by 120 degrees.

In addition to one or more of the features described herein the motor is a three terminal motor. Controlling the flying capacitor multi-level inverter as a DC-DC converter includes, for each of a first inverter leg and a second inverter leg: Providing a first control signal to the first and fourth transistor of the corresponding inverter leg where the first control signal is inverted for the fourth transistor. Providing a second control signal to the second and third transistor of the corresponding inverter leg, where the second control signal is inverted for the third transistor. The first control signals and the second control signals control an open/closed state of the first, second, third and fourth transistor of the corresponding inverter legs via pulse width modulation. Each of the first control signal and the second control signal is phase shifted from the other of the first control signal and second control signal by 180 degrees. Providing a third control signal to the first, second, third and fourth transistor of the third inverter leg, the third control signal setting the first, second, third, and fourth transistor of the third inverter leg to off for a duration of controlling the multi-level inverter as the DC-DC converter.

In addition to one or more of the features described herein the first battery pack and the second battery pack are connected in parallel at one or both of a negative battery terminal and a positive battery terminal.

In addition to one or more of the features described herein the first battery pack and the second battery pack are connected in series via a common node, forming a series connected battery pack.

In addition to one or more of the features described herein a neutral node connects each phase of the motor to the common node.

In addition to one or more of the features described herein a first phase terminal of the of the motor is connected to the common node of the series connected battery pack.

In addition to one or more of the features described herein the first inverter leg is physically disposed closer to the first battery pack and closer to the second battery pack than each of the second inverter leg and the third inverter leg.

In addition to one or more of the features described herein the first battery pack comprises at least a first set of power cells and a second set of power cells connected to the first set of power cells at the return node.

In another exemplary embodiment a method for transferring power between a first battery pack and a second battery pack of a vehicle system includes causing a controller to control a flying capacitor multi-level inverter as a direct current (DC)-DC converter such that a circulating current passes through the flying capacitor multi-level inverter, a motor, a first battery pack and a second battery pack. The vehicle system includes the first battery pack being connected to the second battery pack via the flying capacitor multi-level inverter, the motor being connected to the flying capacitor multi-level inverter, and a motor controller connected to the motor and the flying capacitor multi-level inverter. the motor controller including a memory storing instructions configured to cause the vehicle system to implement the method.

In addition to one or more of the features described herein the multi-level inverter includes three inverter legs. Each inverter leg of the multi-level inverter includes a first transistor connecting a positive bus to a high node a second transistor connecting the high node to an alternating current (AC) output node, a third transistor connecting the AC output node to a low node, and a fourth transistor connecting the low node to a negative bus, and each phase of the motor is connected to the AC output node of a corresponding inverter leg.

In addition to one or more of the features described herein the motor is a four terminal motor. Controlling the flying capacitor multi-level inverter as a DC-DC converter includes, for each inverter leg: Providing a first control signal to the first transistor and the fourth transistor of each inverter leg, with the first control signal being inverted for the fourth transistor. Providing a second control signal to the second transistor and third transistor of each inverter leg, with the second control signal being inverted for the third transistor. The first control signals and the second control signals control an open/closed state of the first, second, third and fourth transistor of the corresponding inverter leg via pulse width modulation. The first control signal and the second control signal are phase shifted from each other first control signal and second control signal by 120 degrees.

In addition to one or more of the features described herein, the motor is a three terminal motor. Controlling the multi-level inverter as a DC-DC converter includes, for each of a first inverter leg and a second inverter leg: Providing a first control signal to the first and fourth transistor of the corresponding inverter leg wherein the first control signal is inverted for the fourth transistor. Providing a second control signal to the second and third transistor of the corresponding inverter leg, wherein the second control signal is inverted for the third transistor. The first control signals and the second control signals control an open/closed state of the first, second, third and fourth transistor of the corresponding inverter legs via pulse width modulation, the first control signal and the second control signal are phase shifted from the other of the first control signal and second control signal by 180 degrees. Providing a third control signal to the first, second, third and fourth transistor of the third inverter leg, the third control signal setting the first, second, third, and fourth transistor of the third inverter leg to off for a duration of controlling the multi-level inverter as the DC-DC converter.

In addition to one or more of the features described herein the first battery pack and the second battery pack are connected in parallel at at least one of a negative battery terminal and a positive battery terminal.

In addition to one or more of the features described herein the first battery pack and the second battery pack are connected in series via a common node forming a series connected battery pack.

In addition to one or more of the features described herein the first battery pack is a first chemistry and the second battery pack is a second chemistry, distinct from the first chemistry.

In yet another exemplary embodiment a vehicle including an electric drive system comprising at least one electric motor, a power distribution system comprising at least a first battery pack and a second battery pack, the power distribution system being connected to the electric drive system via a flying capacitor multi-level inverter, and a controller connected to the motor and the flying capacitor multi-level inverter, the controller including a memory storing instructions configured to cause the controller to control the flying capacitor multi-level inverter as a direct current (DC)-DC converter such that a circulating current passes through the motor, the first battery pack and the second battery pack.

In addition to one or more of the features described herein wherein the flying capacitor multi-level inverter includes three inverter legs, each inverter leg of the flying capacitor multi-level inverter comprises a first transistor connecting a positive bus to a high node, a second transistor connecting the high node to an alternating current (AC) output node point, a third transistor connecting the AC output node to a low node, and a fourth transistor connecting the low node to a negative bus and wherein each phase of the motor is connected to a corresponding inverter leg of the flying capacitor multi-level inverter.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
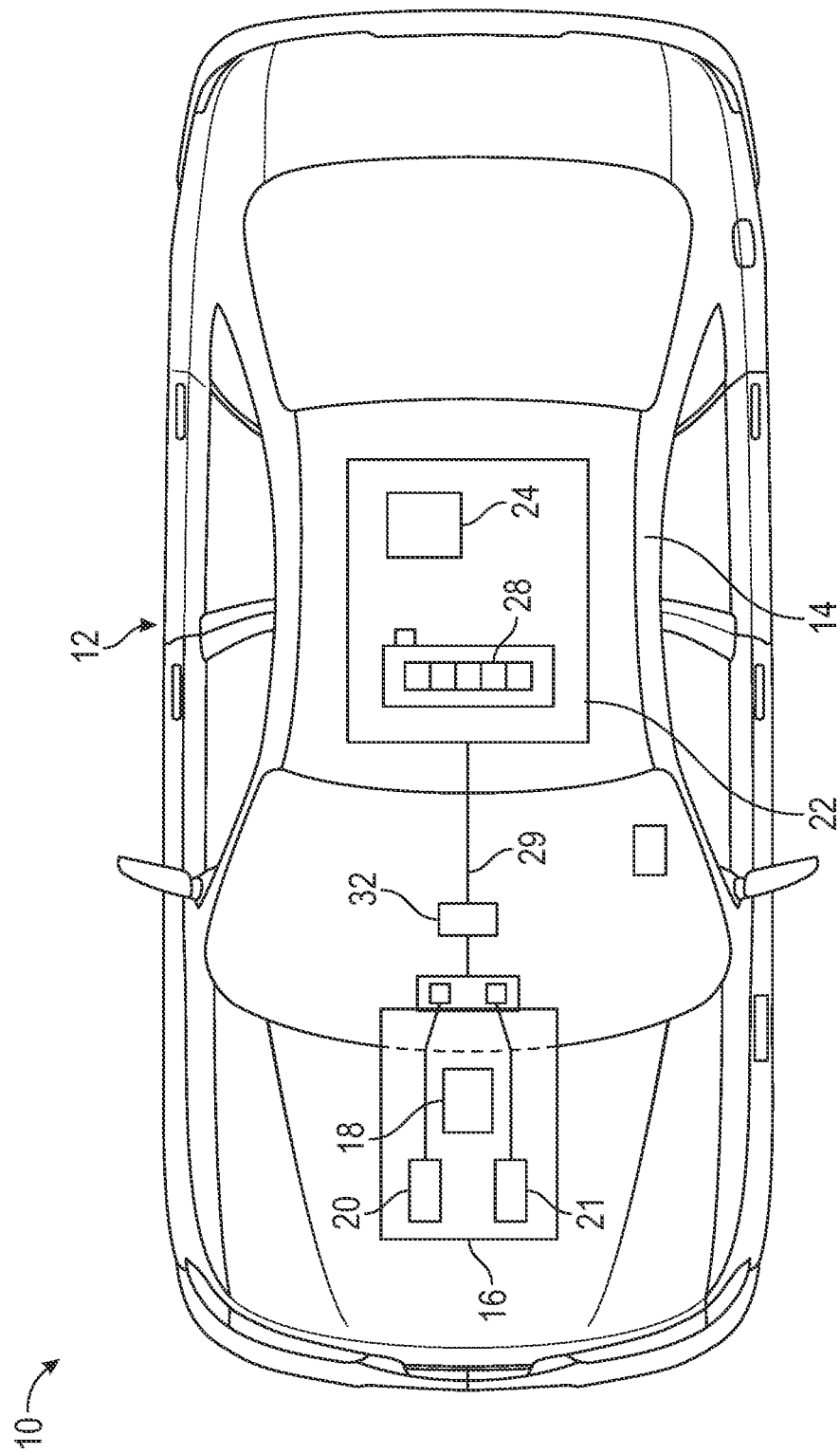
FIG. 1 is a schematic representation of a vehicle including a power distribution system.

The following description is merely exemplary in nature and is not intended to limit the present disclosure, its application or uses.

It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment a vehicle system for a battery includes multiple battery packs having distinct battery pack chemistries. A multi-level inverter converts direct current (DC) power from the battery pack into an alternating current (AC) power form that is provided to a motor and drives the motor to rotate. The characteristics of the motor rotation are controlled by the characteristics of the AC power signal. A motor controller actively controls switching within the multi-level inverter to control the characteristics of the AC power signal.

A memory is configured to cause the motor controller to implement a power balancing, or power transfer operation, between the distinct battery packs by operating the multi-level inverter as a DC-DC converter and utilizing the internal inductance of the motor legs without rotating the motor for the DC-DC converter inductors. The internal inductance of the motor legs can be utilized without causing rotation by controlling the phase shift in the modulation of the AC inverter while it is operating as a DC-DC converter such that rotational forces generated by the current passing through the leg are directly countered by the rotational forces generated by the current passing through the other legs of the motor. The DC-DC converter is then able to transfer power between the battery packs according to known power transfer procedures. In some examples, the switching incorporated to facilitate the operation in DC-DC converter mode can further be utilized to provide fault protection and/or isolation of one or more legs during a fault condition by disconnecting the leg experiencing the fault condition from the corresponding power buses.

The systems of FIGS. 2-7 illustrate an apparatus and method to provide power transfer bidirectionally between mixed chemistry battery packs 102, 104 (e.g. mix of energy and power packs/modules, fuel cell and Li ion packs) using a multilevel flying capacitor inverter drive system as a DC-DC converter (using an non-rotating motor and multi-level inverter during steady driving or any non-rotating motor and multi-level inverter during stationary condition). While operating as the DC-DC converter, the machine winding inductances of each leg of the non-rotating motor along with the respective phase act as a synchronized, or an interleaved, two phase or a three-phase multi-level boost converter (DC-DC converter), with the winding inductance of the third motor leg providing additional boost and filtering action.

A new control scheme is incorporated into the motor controller for operating the multi-level inverter in the DC-DC mode. The control scheme controls an ON/OFF condition to control the power flow in either direction through the non-rotating motor and the multi-level inverter. A charge port can be used to continuously charge either battery pack and the DC-DC converter mode can be used to simultaneously charge the first battery pack from a charge port and the second battery pack from the first battery pack using the DC-DC mode of the multi-level inverter motor system. In some examples, the switches in the muti-level inverter are insulated gate bipolar transistors (IGBTs) with antiparallel diodes or Si/SiC/GaN field effect transistors (FETs). In some examples, the new control scheme is entirely software based and can be retroactively added to existing controllers and applied in an existing motor vehicle without requiring replacement or reconfiguring of parts.

The charging balance or power transfer configuration can either be used for single port or multi-port charging events.

All phases (in the case of a four-terminal motor) or select phases (in the case of a three-terminal motor) are modulated with logic with pre-determined phase-shift (e.g., 180 degrees for a four-terminal motor or 120 degrees for a three-terminal motor) from each other utilized phase. The phase shift is achieved using a pulse width modulation (PWM) control of the internal switches.

The duty cycle and phase relationship between the internal switches (the transistors making up each phase leg of the inverter) is selected to achieve the boost or buck function of the DC-DC converter with power flow in the required direction (e.g., from the first battery pack to the second battery pack) while avoiding short circuiting the main bus. The PWM frequency, duty cycle and phase shift between the switching inverter legs are functions of the charging power and current ripple to be achieved during the charging operation, and can be determined by one of skill in the art.

In an example with series arranged battery packs, a multilevel flying capacitor inverter and the corresponding motor windings of the non-rotating motor are used to actively balance the state of charge of two battery packs during or after series charging.

The second battery pack is continuously charged until a difference of state of charge of the two battery packs is smaller than a predefined threshold.

A four-terminal machine example uses a switch to connect the mid-point of the battery back and the neutral point of the four terminal winding machine. A three-terminal machine example uses a switch to connect the mid-point of the battery packs and one leg terminal of a three-terminal machine.

In some examples, multiple multilevel inverter units can be used to share power that is being transferred to another pack. In addition, an N-level inverter can be used to further reduce the voltage and thermal stresses in DC-DC operation. The control scheme for this function includes continuous battery SOC and energy monitoring for turning off the charging current and commanding contactor/switch turn-off.

The high voltage lines might have additional voltage and/or current sensors/pyro fuse for diagnostics and safety of that high voltage line. The main contactors associated with each pack may also include a pre-charge device in parallel with one main contactor.

With continued reference to the general system described above, FIG. 1 shows an embodiment of a motor vehicle 10. The vehicle 10 includes a vehicle body 12 defining, at least in part, an occupant compartment 14. The vehicle body 12 also supports various vehicle subsystems including a propulsion system 16, a battery system 22, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels (not shown) on opposing sides of the vehicle 10. Any number of motors positioned at various additional locations about the vehicle 10 may be used to provide power to corresponding systems and subsystems.

The battery system 22 may be electrically connected to the motors 20 and 21 and/or other components, such as vehicle electronics. The battery system 22 may be configured as a rechargeable energy storage system (RESS) and includes multiple power cells partitioned into portions. A battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the battery system controller 24 can be a distributed control system including multiple coordinating controllers throughout the vehicle 10 encompassing controllers within the battery system 22 and controllers remote from the battery system 22.

In one embodiment, the battery system 22 includes multiple battery packs 28. The battery packs 28 include multiple distinct battery power cells arranged in parallel and connected to a power distribution bus 29 for providing power to one or more systems. In the exemplary system of FIG. 1, the power distribution bus 29 is illustrated in simplified form as a single line and provides power to the propulsion systems 16 through an inverter 32.

Figure 2:
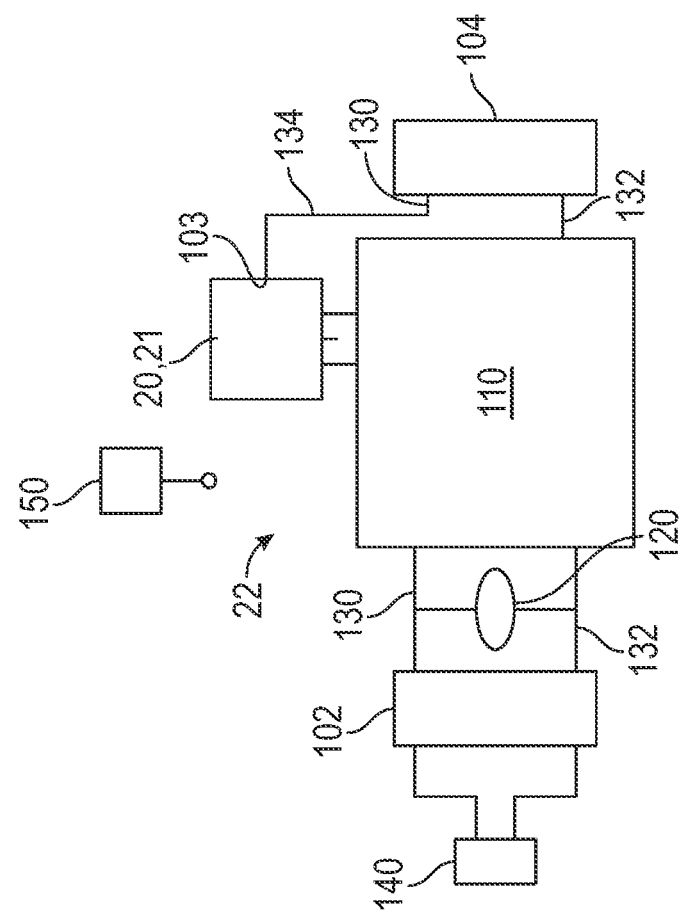
FIG. 2 is a block diagram of a battery system according to one embodiment.
Figure 3:
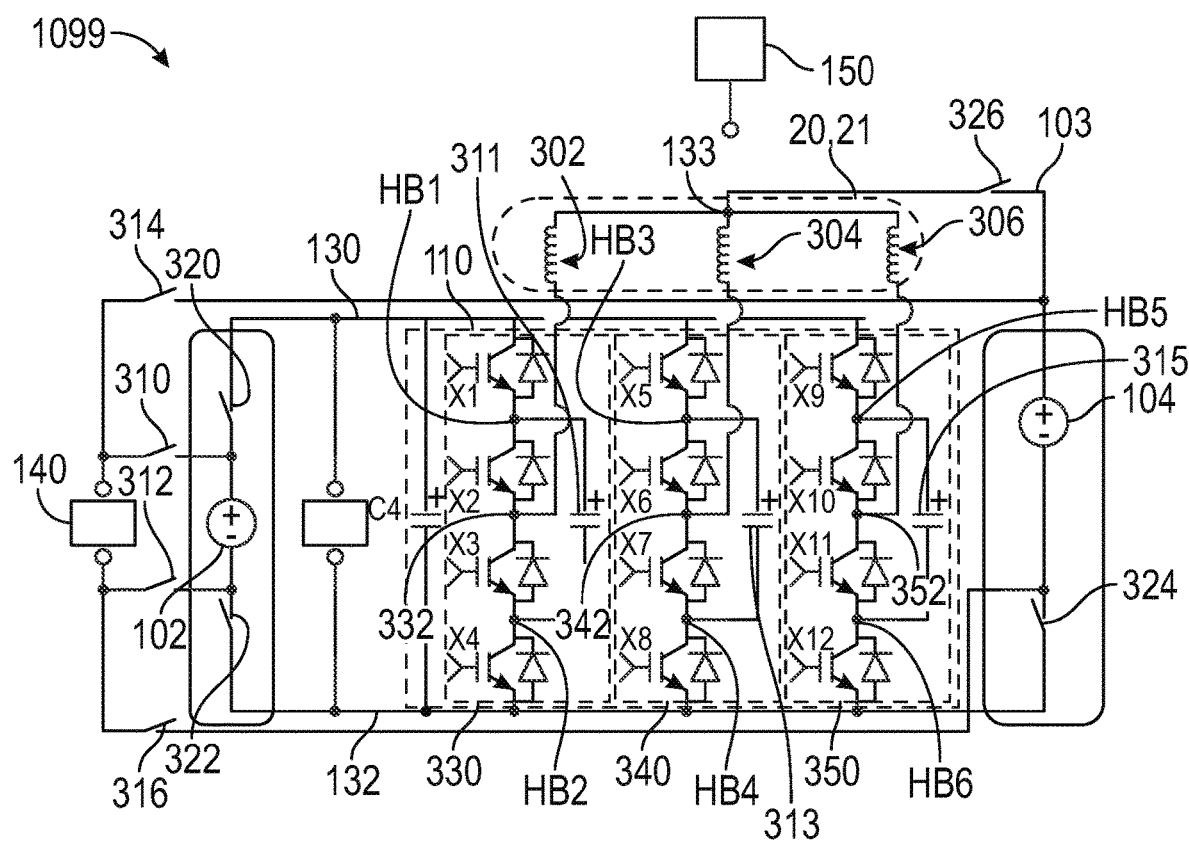
FIG. 3 is a circuit diagram representation of the power transfer method applied to parallel arranged battery packs according to a first example.
Figure 4:
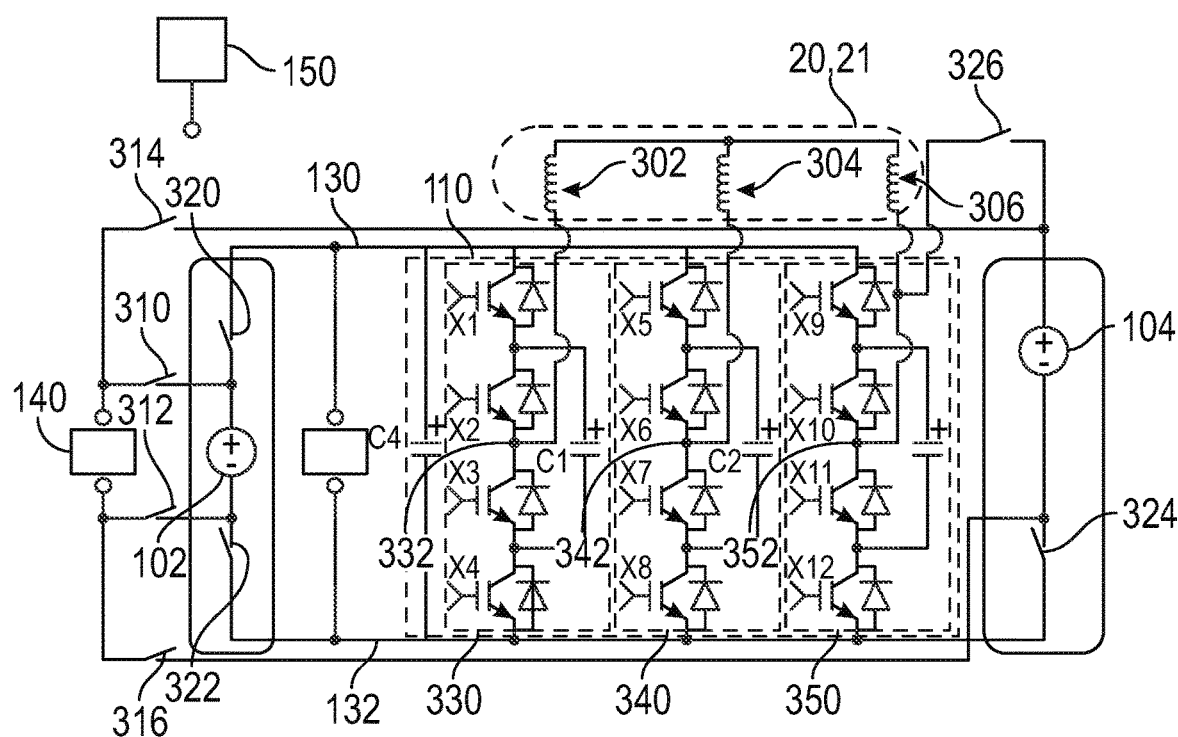
FIG. 4. is a circuit diagram representation of the power transfer method applied to parallel arranged battery packs according to a second example.

With continued reference to FIG. 1, FIG. 2 illustrates a general block diagram of the battery system 22 including a first battery pack 102 and a second battery pack 104. FIGS. 3 and 4 illustrate specific examples of the general block diagram of FIG. 2. The first and second battery packs 102, 104 are in parallel and are connected via a multi-level inverter 110. In the examples illustrated in FIGS. 3-6, the multi-level inverter 110 uses a flying capacitor multi-level inverter topology and is referred to as a flying capacitor multilevel inverter. The multi-level inverter 110 is connected to each leg of a motor 20, 21 and provides operational AC power to the motor 20, 21 from a positive bus 130 during standard operations. In addition to the inverter 110, a load 120 can be connected across a positive bus 130 and a neutral bus 132 and receive power from the battery packs 102, 104. In some examples, such as the illustrated example of FIG. 2 and the specific example of FIG. 3, the motor 20, 21 has a wye leg configuration (alternately referred to as a four terminal motor) with a reference node 103 connected to the positive bus 130 via a connection 134. In other examples, such as the specific example of FIG. 4, the motor 20, 21 has a delta leg configuration (alternately referred to as a three terminal motor) with a floating neutral point (i.e., there is no internal connection of the motor legs to a neutral or reference voltage). The battery system 22 can be connected to a charger 140, such as a wall charger, and the charger 140 allows power to be provided to the battery system 22 for charging the battery packs 102, 104.

The battery system 22 includes mixed chemistry battery packs 102, 104, which can include a mix of fuel cells and lithium (Li) ion packs. Each battery pack 102, 104 includes a single chemistry, and the chemistry of each battery pack 102, 104 is different from the chemistry within the other battery pack 102, 104. The mixed chemistries provide battery packs 102, 104 with distinct power characteristics with some battery packs 102, 104 having a faster charge rate and a lower power density and other battery packs 102, 104 having a slower charge rate and a higher power density. Due to the varying charge rates and power densities, passive balancing by placing the packs in parallel with a filtering inductor as is done for standard battery systems cannot redistribute power properly from one battery pack to the other battery pack.

To properly balance the battery packs 102, 104 during charging and/or immediately after charging is completed, the battery system 22 includes a battery system controller 150. In some examples the battery system controller 24 of FIG. 1 can provide the functions of the battery system controller 150, and in other embodiments the functions are provided by a dedicated controller 150, distributed across multiple vehicle controllers, or any similar control scheme. It is appreciated that reference herein to the controller 150 encompasses the variety of controller types and configurations and is not limited to the illustrated dedicated battery system controller 150.

During charging, or immediately after charging, the battery packs 102, 104 can be imbalanced, or one battery pack may charge faster than the other. When this happens it is desirable to transfer power from one battery pack 102, 104 to the other battery pack 102, 104. As the process described herein utilizes the motor 20, 21 in a non-rotational capacity it may not be suitable for use during vehicle operation depending on the function of the motor. As the battery packs 102, 104 are different chemistries having different power density and charging characteristics, a DC-DC converter is required to transfer the power from one battery pack 102, 104 to the other battery pack 102, 104. The controller 150 is configured to utilize switches connecting the charger 140 to the battery packs 102, 104, operating the inverter 110 in a DC-DC converter mode utilizing the inherent inductance of the motor legs in the motor 132 to pass power from one battery pack 102, 104 to the other battery pack 102, 104 without generating rotational motion within the motor.

By modulating the switching of each leg of the multi-level inverter being utilized for the DC-DC conversion such that the switching in the leg is 180 degrees offset from the other two legs in a three terminal motor, or 120 degrees offset from each other leg being used as a DC-DC converter in a three terminal motor, power passes through each motor leg being used for the DC-DC conversion. This allows the inductance of each motor leg to operate as the DC-DC converter inductor for the corresponding inverter leg of the inverter 110. Modulation of the switches in each inverter leg of the inverter 110 to achieve the DC-DC converter operation occurs according to known techniques.

With continued reference to FIG. 2, FIG. 3 illustrates a more detailed example implementation of the power system of FIG. 2, with the motor 20, 21 being arranged in a wye configuration. Each leg of the motor 20, 21 is illustrated as an inductor representing the internal inductance of that motor leg 302, 304, 306 of the motor 20, 21. The charger 140 is connected to the first battery pack 102 via a first pair of switches 310, 312 and connected to the second battery pack 104 via a second pair of switches 314, 316. One switch 310, 314 in each pair of switches connects the positive terminal of the charger 140 to the corresponding battery pack 102, 104 and a second switch 312, 316 connects the negative terminal of the charger 140 to the corresponding battery pack 102, 104.

Additionally, the first battery pack 102 is connected to the positive bus 130 via a switch 320 and to the negative bus 132 via a switch 322. The second battery pack 104 incudes a connection to the positive bus 130 through switches 314 and 310, and a switch 326 connects the positive side of the second battery pack 104 to a motor neutral point 133 via connection 103. The negative side of the second battery pack 104 is connected to the negative bus 132 via a switch 324.

The inverter 110 is arranged in a multi-level flying capacitor inverter topology including three inverter legs 330, 340, 350. Each inverter leg 330, 340, 350 has a first transistor X1, X5, X9 connecting the positive bus 130 to a high node HB1, HB3, HB5, a second transistor X2, X6, X10 connecting the high node HB1, HB3, HB5 to an AC output node 332, 342, 352, a third transistor X3, X7, X11 connecting the AC output node 332, 342, 352 to a low node HB2, HB4, HB6, and a fourth transistor X4, X8, X12 connecting the low node HB2, HB4, HB6 to the negative bus 132. A capacitor 301, 303, 305 connects the high node HB1, HB3, HB5 to the low node HB2, HB4, HB6 within each inverter leg 302, 304, 306.

AC output node 332, 342, 352 of each leg 330, 340, 350 is connected to a corresponding motor leg 302, 304, 306 of the motor 20, 21. During standard operation, the controller 150 modulates the transistors X1, X2, X3, X4, X5, X6, X7, X8, X9, X10, X11, X12 within each inverter leg 330, 340, 350 of the inverter 110 to drive the motor 20, 21 using whichever battery pack 102, 104 is connected to the positive bus 130 and the negative bus 132.

During charging, or shortly thereafter, it is desirable to balance the power between the battery packs 102, 104 or transfer power from one of the battery packs 102 to the other battery pack 104. By way of example when a first battery pack has a low power density but a high charge rate, it may be beneficial to transfer accumulated power from the faster charging battery pack 102 to the slower charging battery pack 104 in order to expedite the overall charging process.

The balancing and power transfer is achieved by modulating the transistors X1, X2, X3, X4, X5, X6, X7, X8, X9, X10, X11, X12 in the inverter 110 such that the inverter 110 operates as a DC-DC converter using the internal inductances of the motor legs 302, 304, 306 as the corresponding DC-DC converter inductors. In this mode each of the switches 310, 312, 314, 316 connecting the battery packs 102, 104 to the charger 140 are opened, and the switches 320, 322, 324, 326 connecting both battery packs to the positive bus 130 and negative bus 132 are closed. Each inverter leg 330, 340, 350 is modulated at a phase 120 degrees offset from each other inverter leg 330, 340, 350, thereby allowing power to pass through the motor 20, 21 with a net zero rotational force generation and enabling the motor leg inductances to be utilized. While in this configuration, energy circulates through the motor legs 302, 304, 306 and the corresponding inverter legs 330, 340, 350 which converts the DC power to a voltage and current level that can be accepted by the receiving battery pack 102, 104. The power with the new characteristic is provided to the power bus 130, 132, allowing power to be transferred from one battery pack 102, 104 to the other battery pack 102, 104.

In addition, as each battery pack 102, 104 is connected to both power busses 130, 132, and the charger 140, via switches, the controller 150 can isolate, or remove, a single battery pack 102, 104 while one of the battery packs 102, 104 is in a fault condition. To isolate the faulty battery pack 102, 104 the corresponding switches 320, 322, 326, 328 connecting that battery pack 102, 104 to the busses 130, 132 are maintained open, resulting in the battery pack 102, 104 being electrically isolated.

In some examples, additional switches can be incorporated in the system of FIG. 3 in order to allow one or more of the inverter phase leg capacitors to be utilized as a DC-DC input.

Figure 7:
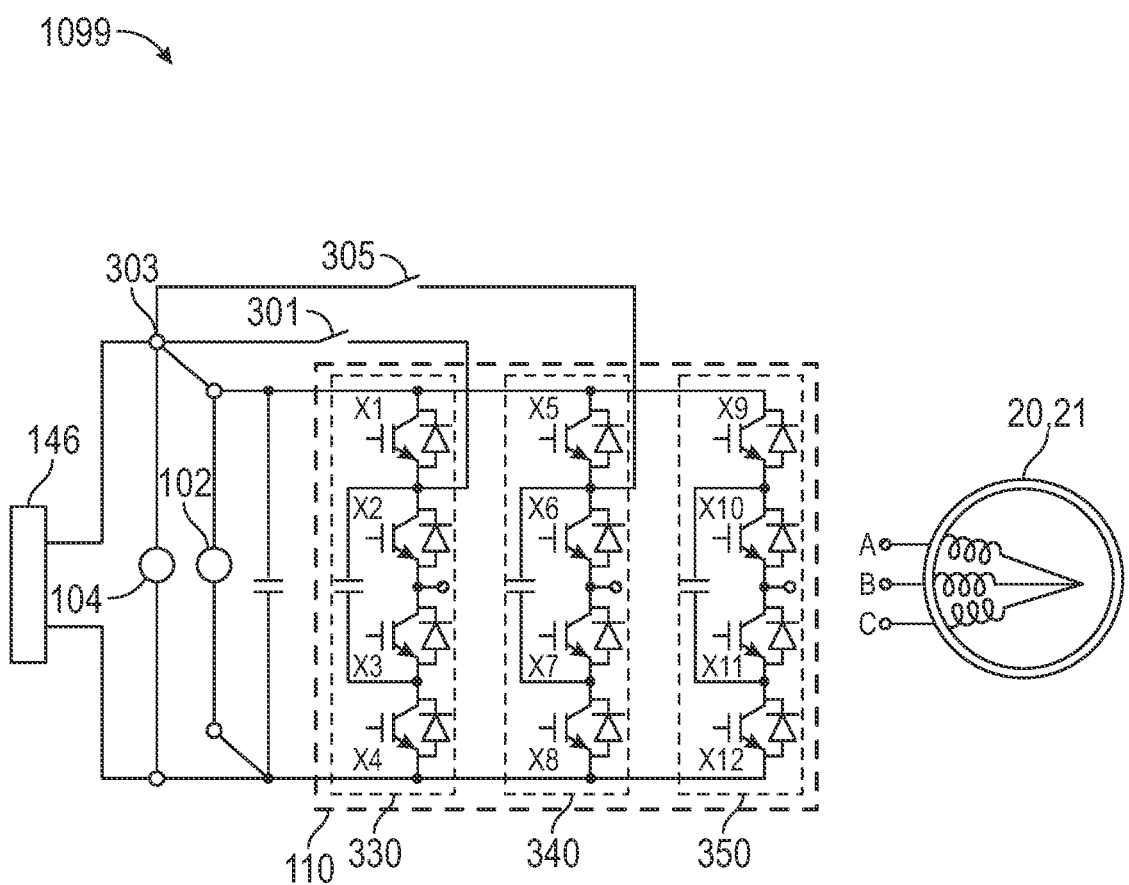
FIG. 7 illustrates an optional switch configuration for enhancing the direct current (DC-DC) converter operations in a three-terminal machine.

FIG. 7 illustrates one such example with switches 310, 314, 320 closed and switches 312, 316, 322 closed. As the switches 310, 312, 314, 316, 320, 322 are closed and current is unimpeded, they are omitted from the illustration for clarity. In the example of FIG. 7, a switch 301 is added connecting the node HB1 connecting the first transistor X1 and the second transistor X2 of the first inverter leg 330 to a positive terminal 303 of the first battery pack 102, the second battery pack 104, and the charger 140.

In addition, a second switch 305 is added connecting node HB3 of the second inverter leg 340 to the positive terminal 303 of the first battery pack 102, the second battery pack 104, and the charger 140.

The addition of switches 301, 305 allows for the utilization of the inverter leg capacitors 311, 313 as input DC capacitors for the DC-DC converter operations of the inverter 110. When a single switch 301, 305 is closed, the corresponding capacitor 311, 313 operates as the input DC capacitor. Closing both switches 301, 305 utilizes the combined capacitance of 311 and 313 as the input DC capacitor. In systems designed to only utilize one capacitor 311, 313, one of the switches 301, 305 can be omitted entirely, thereby reducing cost and complexity of the circuit. The inverter leg capacitor 315 of the third inverter leg 350 is bypassed and does not affect the circuit.

Referring to FIG. 4, when the motor 20, 21 is configured in a delta configuration, there is no neutral point within the motor 20, 21 that the switch 326 can connect to. This configuration is illustrated in FIG. 4, where like numerals with FIGS. 2 and 3 indicate like elements and configurations. Structurally, the example of FIG. 4 varies from that of FIG. 3, only in that the switch 326 connects the AC output node 352 of the leg 350 of the inverter 110. Further, in the interest of clarity certain numerals are omitted from FIGS. 4-7. Absence of the numerals does not indicate a structural difference between embodiments of the inverter legs 302, 304, 306, 530, 540, 550. While operating in the DC-DC converter mode power passes through the motor leg 306 corresponding to the AC inverter leg 350 that is switched off, resulting in the power passing through the motor leg 306 and each other leg 330, 340 as they are modulated to create DC power of the appropriate power characteristic. In this mode, the power from the second battery pack 104 is passed through the switch 326 and flows through the third inductor 306 leg of the motor 20, 21 into each of the other inductor 302, 304 legs 302, 304 of the motor 20, 21. The energy is passed through the legs 330, 340 and provided to the first battery pack 102.

In the example of the delta motors, (FIGS. 4 and 6) it can be beneficial to ensure that the inverter leg that is not operated during the DC-DC converter operation is the inverter leg 330, 340, 350, 530, 540, 550 that is physically closest to the series arranged battery packs 102, 104. In some configurations this inverter leg 330, 340, 350, 530, 540, 550 is between the series arranged battery packs 102, 104 and the other inverter legs 330, 340, 350, 530, 540, 550. Utilizing the inverter leg 330, 340, 350, 530, 540, 550 physically closest to the battery packs 102, 104 provides thermal separation between the battery packs 102, 104 and the operating inverter legs 330, 340, 350, 530, 540, 550 minimizing the chances of excess heating.

Figure 5:
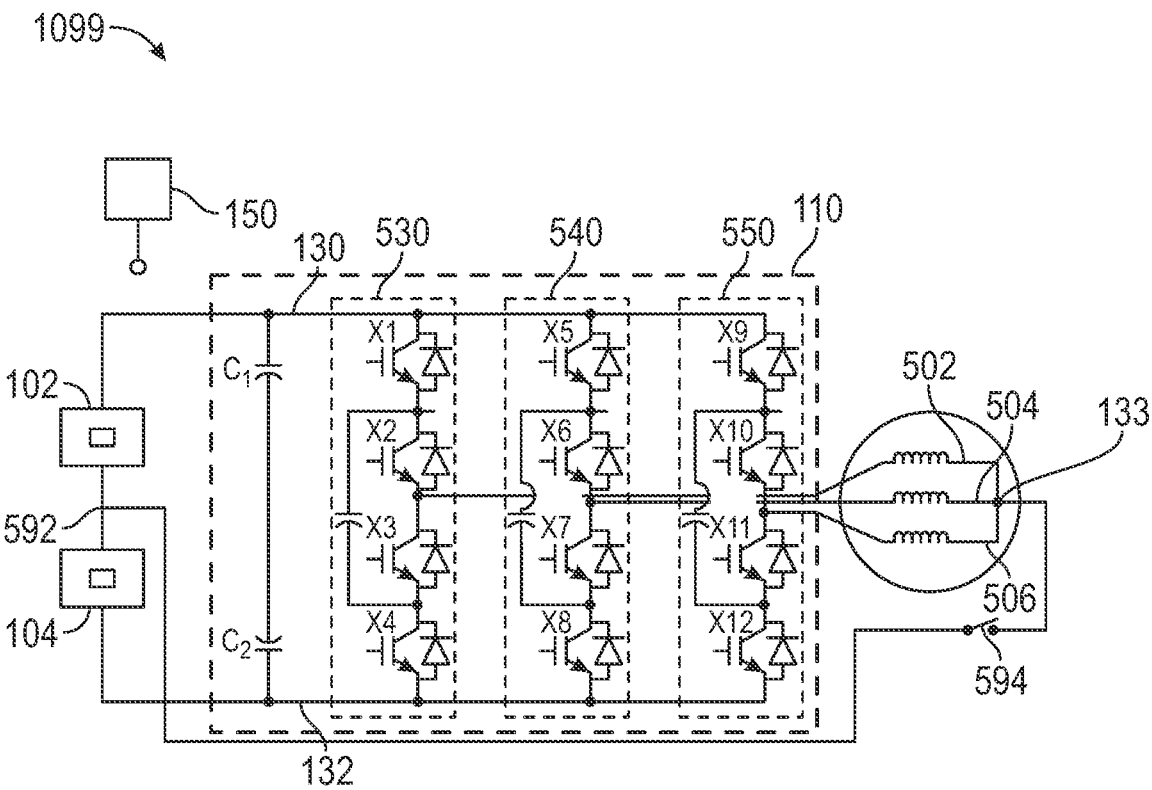
FIG. 5 is a circuit diagram of the power transfer method applied to series arranged battery packs according to a first example.
Figure 6:
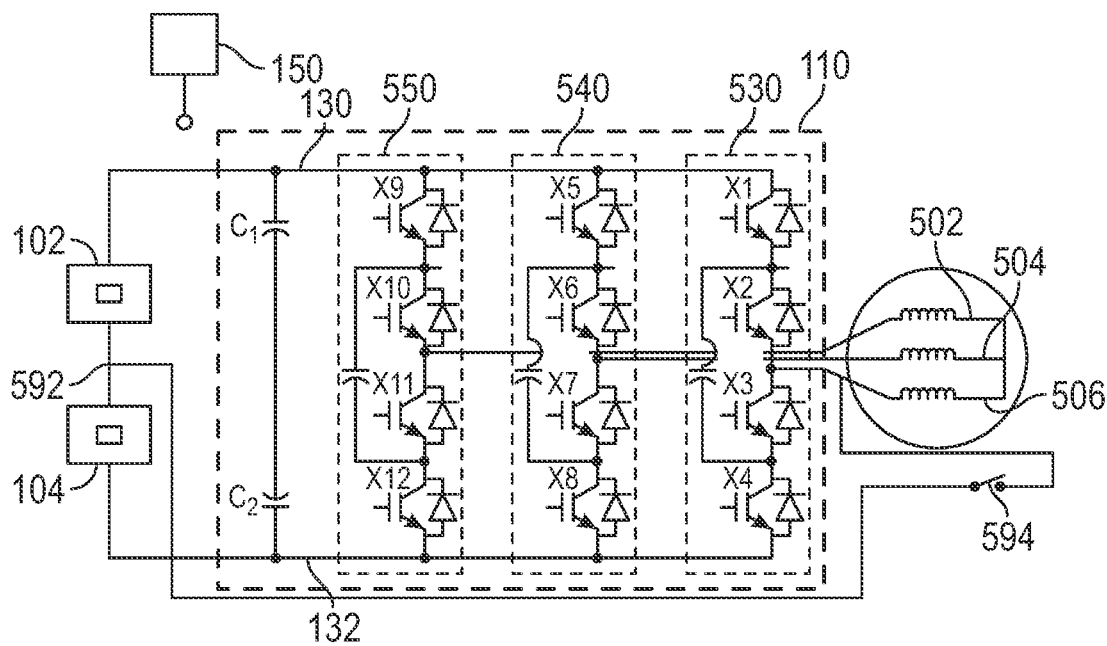
FIG. 6 is a circuit diagram of the power transfer method applied to series arranged battery packs according to a second example.

Referring now to FIGS. 5 and 6, in some instances, the distinct chemistry battery packs 102, 104 may be arranged in series between a positive bus 130 and a negative bus 132. Such examples are illustrated in FIGS. 5 and 6, with FIG. 5 illustrating a connected wye motor 20, 21 and FIG. 6 illustrating a connected delta motor 20, 21. The inverter legs 530, 540, 550 illustrated in FIGS. 5 and 6 are arranged identically as those illustrated in FIGS. 3 and 4.

With reference to FIG. 5 specifically, the two sets of battery packs 102, 104 are connected in series across a positive bus 130 and a negative bus 132, with a positive terminal of the second battery pack 104 being connected to a negative terminal of the first battery pack 102 at a battery pack node 592. The battery pack node 592 is connected to a neutral node 133 of the motor 20, 21 via a switch 594. While the inverter 110 legs 530, 540, 550 are being driven in DC-DC converter mode, the switch 594 is closed which creates a current circulation path between the battery packs 102, 104 with each motor leg 502, 504, 506 providing the internal motor leg inductance and the switches of the corresponding inverter leg 530, 540, 550 being modulated 120 degrees offset from each other inverter leg 530, 540, 550. The current circulation between the battery packs 102, 104 in this mode equalizes the charge in each battery pack 102, 104, and the mode can be used during, or after, series charging of the battery packs 102, 104.

With continued reference to FIGS. 1-5, FIG. 6 schematically illustrates the series connected battery packs 102, 104 with a motor 20, 21 having a delta configuration instead of the wye configuration illustrated in FIG. 5. In the delta configuration the battery pack node 592 is connected to the motor leg 502 when the switch 594 is closed. While the switches in each inverter leg 530, 540, 550 are operated as a DC-DC converter, the switch 594 creates a current circulation path from the second battery back 104 through the first motor leg 502 and into each of the second and third motor legs 504, 506, then back into the first battery pack 102. Each of the second and third motor legs 504, 506 are modulated with a phase shift that is offset from the other leg 504, 506 by 180 degrees in order to ensure that the motor 20, 21 does not rotate. While the switch 594 is closed (allows current to pass) the charge level between the two battery packs 102, 104 equalizes.

In each of the above examples, illustrated in FIGS. 3-6, the distinct chemistry battery packs 102, 104 are illustrated as single battery packs. It is appreciated that each single battery pack 102, 104 can be replaced with a set of series arranged sub-battery packs, provided each series arranged sub battery pack includes an identical chemistry to each other series arranged sub battery pack in the battery pack 102, 104. In some instances, the sub-battery packs can each have identical storage capacity. In other examples, the sub-battery packs can have distinct storage capacities. In any configuration, the total capacity of the battery pack 102, 104 is the sum of the capacity of each sub battery pack in the battery pack.

In each of the examples of FIGS. 2-6, the operation of the AC inverter 110 as a DC-DC converter is described generally. It is appreciated that practical operations will vary slightly depending on whether the motor 20, 21 is connected in a delta (FIGS. 3 and 5) or a wye (FIGS. 4 and 6) configuration.

With reference to the examples of FIGS. 3 and 5 (Wye motors 20, 21, also referred to as four terminal motors 20, 21) controlling the multi-level inverter 110 as a DC-DC converter includes, for each inverter leg 330, 530, 340, 540, 350, 550: Providing a first control signal to the first transistor X1, X5, X9 and the fourth transistor X4, X8, X12 of each inverter leg 330, 530, 340, 540, 350, 550, with the first control signal being inverted for the fourth transistor X4, X8, X12. Providing a second control signal to the second transistor X2, X6, X10 and third transistor X3, X7, X11 of each inverter leg 330, 530, 340, 540, 350, 550, with the second control signal being inverted for the third transistor X3, X7, X11. The first control signals and the second control signals control an open/closed state of the first, second, third and fourth transistor X1, X2, X3, X4, X5, X6, X7, X8, X9, X10, X11, X12 of the corresponding inverter leg 330, 530, 340, 540, 350, 550 via pulse width modulation. The first control signals and the second control signals are phase shifted from each other first control signal and second control signal by 120 degrees.

With reference to the examples of FIGS. 4 and 6, (delta motors 20, 21, alternately referred to as three terminal motors 20, 21) controlling the multi-level inverter 110 as a DC-DC converter for each of a first inverter leg 330, 530 and a second inverter leg 340, 540, providing a first control signal to the first and fourth transistor X1, X4, X5, X8 of the corresponding inverter leg 330, 340, 530, 540. The first control signal is inverted for the fourth transistor X4, X8. Providing a second control signal to the second and third transistor X2, X3, X6, X7 of the corresponding inverter leg 330, 340, 530, 540. The second control signal is inverted for the third transistor X3, X7. The first control signals and the second control signals control an open/closed state of the first, second, third and fourth transistor X1, X2, X3, X4, X5, X6, X7, X8 of the corresponding inverter legs 330, 340, 530, 540 via pulse width modulation, the first control signal and the second control signal are phase shifted from the other of the first control signal and second control signal by 180 degrees. Providing a third control signal to the first, second, third and fourth transistor X9, X10, X11, X12 of the third inverter leg, 350, 550 the third control signal setting the first, second, third, and fourth transistor X9, X10, X11, X12 of the third inverter leg 350, 550 to off for a duration of controlling the multi-level inverter 110 as the DC-DC converter.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle system comprising;
   a first battery pack connected to a second battery pack via a flying capacitor multi-level inverter having a plurality of inverter legs, with each inverter leg being arranged in a flying capacitor topology;
   a motor connected to the flying capacitor multi-level inverter, the motor having three phases; and
   a controller connected to the motor and the flying capacitor multi-level inverter, the controller including a memory storing instructions configured to cause the controller to control the flying capacitor multi-level inverter as a direct current (DC)-DC converter such that a circulating current passes through the motor, the first battery pack and the second battery pack.

2. The vehicle system of claim 1, wherein each inverter leg of the flying capacitor multi-level inverter comprises a first transistor connecting a positive bus to a high node a second transistor connecting the high node to an alternating (AC) output node, a third transistor connecting the AC output node to a low node, and a fourth transistor connecting the low node to a negative bus; and
  wherein each phase of the motor is connected to an AC output node of a corresponding inverter leg of the flying capacitor multi-level inverter.

3. The vehicle system of claim 2, wherein the motor is a four terminal motor, and wherein controlling the flying capacitor multi-level inverter as a DC-DC converter comprises:
  for each inverter leg, providing a first control signal to the first transistor and the fourth transistor, with the first control signal being inverted for the fourth transistor;
  providing a second control signal to the second transistor and third transistor of each inverter leg, with the second control signal being inverted for the third transistor,
  wherein the first control signals and the second control signals control an open/closed state of the first, second, third and fourth transistor of the corresponding inverter leg via Pulse Width Modulation (PWM); and
  wherein each first control signal is phase shifted from each other first control signal by 120 degrees and each second control signal is phase shifted from each other second control signal and second control signal by 120 degrees.

4. The vehicle system of claim 2, wherein the motor is a three terminal motor, and wherein controlling the flying capacitor multi-level inverter as a DC-DC converter comprises:
  for each of a first inverter leg and a second inverter leg, providing a first control signal to the first and fourth transistor of the corresponding inverter leg wherein the first control signal is inverted for the fourth transistor;
  providing a second control signal to the second and third transistor of the corresponding inverter leg, wherein the second control signal is inverted for the third transistor;
  wherein the first control signals and the second control signals control an open/closed state of the first, second, third and fourth transistor of the corresponding inverter legs via Pulse Width Modulation;
  wherein each first control signal is phase shifted from the other first control signal by 180 degrees and each second control signal is phase shifted from the other second control signal by 180 degrees; and
  providing a third control signal to the first, second, third and fourth transistor of the third inverter leg, the third control signal setting the first, second, third, and fourth transistor of the third inverter leg to off for a duration of controlling the multi-level inverter as the DC-DC converter.

5. The vehicle system of claim 1, wherein the first battery pack and the second battery pack are connected in parallel at one or both of a negative battery terminal and a positive battery terminal.

6. The vehicle system of claim 1, wherein the first battery pack and the second battery pack are connected in series via a common node, forming a series connected battery pack.

7. The vehicle system of claim 6, wherein a neutral node connects each phase of the motor to the common node.

8. The vehicle system of claim 6, wherein a first phase terminal of the of the motor is connected to the common node of the series connected battery pack.

9. The vehicle system of claim 8, wherein a first inverter leg is physically disposed closer to the first battery pack and closer to the second battery pack than each of a second inverter leg and a third inverter leg.

10. The vehicle system of claim 1, wherein the first battery pack comprises at least a first set of power cells and a second set of power cells connected to the first set of power cells at the low node.

11. A method for transferring power between a first battery pack and a second battery pack of a vehicle system comprising:
  causing a controller to control a flying capacitor multi-level inverter as a direct current (DC)-DC converter such that a circulating current passes through the flying capacitor multi-level inverter, a motor, a first battery pack and a second battery pack,
  wherein the vehicle system comprises the first battery pack connected to the second battery pack via the flying capacitor multi-level inverter, the motor connected to the flying capacitor multi-level inverter; and
  a motor controller connected to the motor and the flying capacitor multi-level inverter, the motor controller including a memory storing instructions configured to cause the vehicle system to implement the method.

12. The method of claim 11, wherein the flying capacitor multi-level inverter includes three inverter legs, each inverter leg of the flying capacitor multi-level inverter comprising a first transistor connecting a positive bus to a high node a second transistor connecting the high node to an alternating current (AC) output node, a third transistor connecting the AC output node to a low node, and a fourth transistor connecting the low node to a negative bus; and
  wherein each phase of the motor is connected to the AC output node of a corresponding inverter leg.

13. The method of claim 12, wherein the motor is a four terminal motor, and wherein controlling the flying capacitor multi-level inverter as a DC-DC converter comprises:
  for each inverter leg, providing a first control signal to the first transistor and the fourth transistor, with the first control signal being inverted for the fourth transistor;
  providing a second control signal to the second transistor and third transistor of each inverter leg, with the second control signal being inverted for the third transistor;
  wherein the first control signals and the second control signals control an open/closed state of the first, second, third and fourth transistor of the corresponding inverter leg via Pulse Width Modulation; and
  wherein each first control signal is phase shifted from each other first control signal by 120 degrees, and each second control signal is phase shifted from each other second control signal by 120 degrees.

14. The method of claim 12, wherein the motor is a three terminal motor, and wherein controlling the multi-level inverter as a DC-DC converter comprises:
  for each of a first inverter leg and a second inverter leg, providing a first control signal to the first transistor and fourth transistor of the corresponding inverter leg wherein the first control signal is inverted for the fourth transistor, providing a second control signal to the second transistor and third transistor of the corresponding inverter leg, wherein the second control signal is inverted for the third transistor, the first control signals and the second control signals controlling an open/closed state of the first transistor, second transistor, third transistor and fourth transistor of the corresponding inverter legs via pulse width modulation;

wherein each first control signal is phase shifted from the other first control signal and each second control signal is phase shifted from the other second control signal by 180 degrees; and providing a third control signal to the first, second, third and fourth transistor of the third inverter leg, the third control signal setting the first, second, third, and fourth transistor of a third inverter leg to off for a duration of controlling the multi-level inverter as the DC-DC converter.

15. The method of claim 11, wherein the first battery pack and the second battery pack are connected in parallel at at least one of a negative battery terminal and a positive battery terminal.

16. The method of claim 11, wherein the first battery pack and the second battery pack are connected in series via a common node forming a series connected battery pack.

17. The method of claim 11, wherein the first battery pack is a first chemistry and the second battery pack is a second chemistry, distinct from the first chemistry.

18. A vehicle comprising:
an electric drive system comprising at least one electric motor, the electric motor having three phases;
a power distribution system comprising at least a first battery pack and a second battery pack, the power distribution system being connected to the electric drive system via a flying capacitor multi-level inverter; and
a controller connected to the electric motor and the flying capacitor multi-level inverter, the controller including a memory storing instructions configured to cause the controller to control the flying capacitor multi-level inverter as a direct current (DC)-DC converter such that a circulating current passes through the electric motor, the first battery pack and the second battery pack.

19. The vehicle of claim 18, wherein the flying capacitor multi-level inverter includes three inverter legs, each inverter leg of the flying capacitor multi-level inverter comprises a first transistor connecting a positive bus to a high node, a second transistor connecting the high node to an alternating current (AC) output node point, a third transistor connecting the AC output node to a low node, and a fourth transistor connecting the low node to a negative bus; and wherein each phase of the electric motor is connected to a corresponding inverter leg of the flying capacitor multi-level inverter.

* * * * *